D. R. LUCAS.
Tire-Tightening Washer.

No. 213,765. Patented April 1, 1879.

Witnesses:
J. W. Garner
W. S. D. Hamel

Inventor:
D. R. Lucas,
per
F. A. Lehmann,
atty.

UNITED STATES PATENT OFFICE.

DANIEL R. LUCAS, OF MOUND STATION, ILLINOIS.

IMPROVEMENT IN TIRE-TIGHTENING WASHERS.

Specification forming part of Letters Patent No. 213,765, dated April 1, 1879; application filed February 17, 1879.

*To all whom it may concern:*

Be it known that I, DANIEL R. LUCAS, of Mound Station, in the county of Brown and State of Illinois, have invented certain new and useful Improvements in Tire-Setters; and I do hereby declare the following to be a full, clear, and exact description of the invention, such as will enable others skilled in the art to which it pertains to make and use it, reference being had to the accompanying drawings, which form part of this specification.

My invention relates to an improvement in tire-setters; and it consists in placing a divided washer having hooked ends between the felly and the shoulder on the end of the spoke, whereby the tire is tightened on the wheel, as will be more fully described hereinafter.

Figure 1:
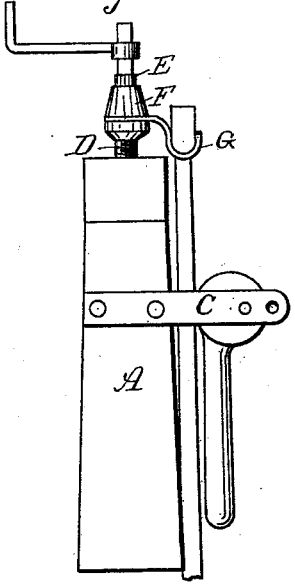
Figure 2:
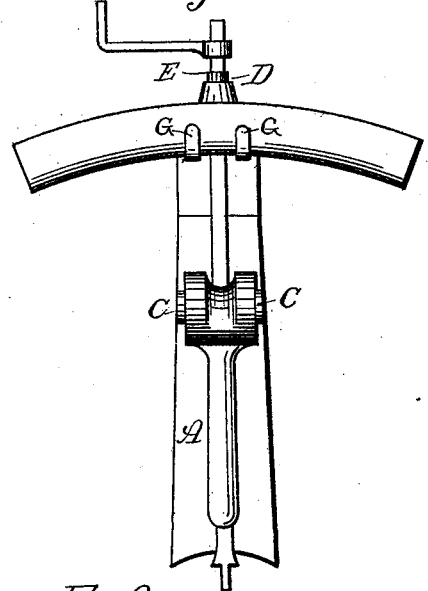
Figure 3:
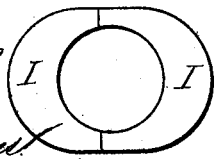
Figure 4:
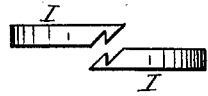

Figure 1 is a side elevation of my invention. Fig. 2 is an edge view of the same. Figs. 3 and 4 are views of the divided washer.

A represents a suitable post, which, with screw combined, is made just long enough to reach about to the inside edge of the fellies of an ordinary wheel when the inner end of the post is resting upon the hub. Fastened to each side of the post are the two projections or ears C, in between which is pivoted the eccentric cam-lever, for grasping a spoke and holding it rigidly in position while the tire is being tightened.

In order to accommodate spokes of different sizes the ears are provided with a series of holes, and the pivot of the lever is made removable, so that it can be placed in any of the holes, as occasion may require.

Screwed into the end of the post is a screw-rod, D, which is provided with the shoulder E. Over the end of this rod, so as to rest upon the shoulder, is passed the sleeve F, having the two hooks G projecting from it. This sleeve fits loosely upon the rod, so as to allow the rod to have a handle or crank applied to its outer end, whereby the rod may be screwed outward without causing the sleeve E to turn around with it. These hooks are made to catch under the felly, one on each side of the spoke, and then the cam-lever is turned down, so as to make it clamp the spoke rigidly to the post. The screw-rod is then screwed outward until the hooks have drawn the felly out sufficiently far to make it tighten the tire to any desired degree, leaving a corresponding space between the shoulder on the end of the spoke and the inner side of the felly.

A washer, I, divided in the center and having its ends hooked, as shown, is then passed around the spoke between the shoulder and the felly, and its ends are driven past each other until the hooks pass each other and lock.

This washer may be, of course, of any desired thickness; but should be regulated as nearly as possible to the amount of tightening that each wheel requires. As the felly cannot move inward after the washer has been placed upon the spoke, it will be seen that the tire will be kept constantly tightened at all times thereafter.

By means of a device as above constructed, each person can tighten his own tires with very little trouble and very slight expense.

Having thus described my invention I claim—

A divided washer having its ends hooked, so that they will lock after passing each other, substantially as set forth.

In testimony that I claim the foregoing I have hereunto set my hand this 7th day of February, 1879.

DANIEL R. LUCAS.

Witnesses:
WM. H. BULMAN,
T. J. LASHER.